(12) United States Patent  
Capek (10) Patent No.: US 12,496,075 B2  
(45) Date of Patent: Dec. 16, 2025

(54) HEART RATE SYNCHRONOUS ASPIRATION SYSTEM AND METHOD FOR TREATMENT OF ISCHEMIC STROKE

(71) Applicant: Stepan Capek, Charlottesville, VA (US)

(72) Inventor: Stepan Capek, Charlottesville, VA (US)

( * ) Notice: Subject to any disclaimer, the term of this patent is extended or adjusted under 35 U.S.C. 154(b) by 839 days.

(21) Appl. No.: 17/709,276

(22) Filed: Mar. 30, 2022

(65) Prior Publication Data

US 2022/0313289 A1    Oct. 6, 2022

Related U.S. Application Data

(60) Provisional application No. 63/168,677, filed on Mar. 31, 2021.

(51) Int. Cl.
| | | |
|---|---|---|
| *A61B 17/22* | (2006.01) | |
| *A61M 1/00* | (2006.01) | |
| *A61M 39/24* | (2006.01) | |

(52) U.S. Cl.
CPC ............ *A61B 17/22* (2013.01); *A61M 1/73* (2021.05); *A61M 39/24* (2013.01);
(Continued)

(58) Field of Classification Search
CPC .......... A61B 17/22; A61B 2017/22079; A61B 2017/00703; A61B 2217/005; A61M 1/73;
(Continued)

(56) References Cited

U.S. PATENT DOCUMENTS

| | | |
|---|---|---|
| 5,885,244 A | 3/1999 | Leone et al. |
| 9,526,864 B2 | 12/2016 | Quick |

(Continued)

FOREIGN PATENT DOCUMENTS

| | | |
|---|---|---|
| AU | 2018253494 B2 | 8/2020 |
| EP | 3419528 A1 | 1/2019 |

(Continued)

OTHER PUBLICATIONS

Simon S, Grey CP, Massenzo T, et al, "Exploring the efficacy of cyclic vs static aspiration in a cerebral thrombectomy model: an initial proof of concept study", Journal of Neurointerventional Surgery, 2014, vol. 6, Issue 9, British Medical Journal, Richond, Virgina, United States, Available from Internet <URL: https://jnis.bmj.com/content/6/9/677>.

(Continued)

*Primary Examiner* — Rebecca E Eisenberg  
*Assistant Examiner* — Matthew Wrubleski  
(74) *Attorney, Agent, or Firm* — Gallium law; Jacob Panangat; Justin Schwechter (57) ABSTRACT

A aspiration system synchronous with heart-rate or other biometric signal used to determine cerebral blood pulsatility, that can include at least one sensor configured to be coupled to a patient. The at least one sensor can be electrically coupled to a heart-rate or other biometric signal monitor, which can be configured to detect a heartbeat or other biometric signal of the patient. A catheter with a distal end inserted into the patient can be coupled at the proximal end to the distal end of aspiration tubing. The proximal end of the aspiration tubing can be coupled to a collecting canister and to a vacuum generator, which is configured to pull a vacuum through the catheter to thereby aspirate a thrombus from the patient via the catheter. The vacuum generator can be configured to aspirate in response to the heart-rate or other biometric signal that can be used to determine cerebral blood pulsatility.

18 Claims, 7 Drawing Sheets

(52) U.S. Cl.
CPC .............. *A61B 2017/22079* (2013.01); *A61M 2205/3331* (2013.01); *A61M 2230/06* (2013.01)

(58) Field of Classification Search
CPC .......... A61M 39/24; A61M 2205/3331; A61M 2230/06; A61M 1/75; A61M 2205/3561; A61M 2205/3576; A61M 2230/08; A61M 2230/205; A61M 2230/30
See application file for complete search history.

(56) References Cited

U.S. PATENT DOCUMENTS

| | | | |
|---|---|---|---|
| 9,681,882 | B2 | 6/2017 | Garrison et al. |
| 9,883,885 | B2 | 2/2018 | Hendrick et al. |
| D850,490 | S | 6/2019 | Janardhan et al. |
| 10,335,260 | B2 | 7/2019 | Janardhan et al. |
| 10,441,745 | B2 | 10/2019 | Yang et al. |
| 10,471,233 | B2 | 11/2019 | Garrison et al. |
| 10,517,633 | B2 | 12/2019 | Nash et al. |
| 10,531,883 | B1 | 1/2020 | Deville et al. |
| 10,653,434 | B1 | 5/2020 | Yang et al. |
| 10,661,053 | B2 | 5/2020 | Yang et al. |
| 10,716,583 | B2 | 7/2020 | Look |
| 10,751,159 | B2 | 8/2020 | Janardhan et al. |
| 10,786,270 | B2 | 9/2020 | Yang et al. |
| 11,096,703 | B2 | 8/2021 | Panian |
| 2011/0263976 | A1* | 10/2011 | Hassan ............... A61M 1/3613 604/523 |
| 2014/0100518 | A1* | 4/2014 | Baxter ............... A61M 3/0212 604/93.01 |
| 2016/0166265 | A1 | 6/2016 | Nita |
| 2017/0296712 | A1 | 10/2017 | Anton |
| 2019/0167406 | A1 | 6/2019 | Janardhan et al. |
| 2019/0357697 | A1* | 11/2019 | Zufi ....................... A61B 5/486 |
| 2020/0009301 | A1 | 1/2020 | Yee |
| 2020/0015518 | A1 | 1/2020 | Lopez |
| 2021/0220528 | A1 | 7/2021 | Jalgaonkar et al. |
| 2021/0353314 | A1 | 11/2021 | Porter |
| 2022/0061872 | A1 | 3/2022 | Mintz |

FOREIGN PATENT DOCUMENTS

| | | |
|---|---|---|
| WO | 2014151209 A8 | 11/2014 |
| WO | 2018019829 A1 | 2/2018 |
| WO | 2019213179 A1 | 11/2019 |

OTHER PUBLICATIONS

TZ Medical, "Control Mechanical Thrombectomy System", downloaded May 24, 2022, Available from Internet <URL: https://jnis.bmj.com/content/6/9/677>.

* cited by examiner

HEART RATE SYNCHRONOUS ASPIRATION SYSTEM AND METHOD FOR TREATMENT OF ISCHEMIC STROKE

BACKGROUND

Field

The invention disclosed herein describes a heart-rate synchronous aspiration system and method of use for thrombectomy procedures. In some embodiments, the system and method may improve procedures; for example, but not limited to, treatment of ischemic stroke.

Description of Related Art

Ischemic stroke is one of the leading causes of morbidity and mortality worldwide. Current treatment methods include administration of intravenous thrombolytic therapy, and, in eligible patients, surgical recanalization (mechanical thrombectomy). Eligible patients are typically characterized by a combination of acute large vessel occlusion in major vessels in the brain and a sufficient amount of salvageable brain tissue, known as the penumbra.

State of the art thrombectomy (e.g., aspiration thrombectomy, aspiration embolectomy, mechanical thrombectomy, and mechanical embolectomy for the purposes of this document) involves advancing an aspiration catheter to the immediate vicinity of a thrombus causing occlusion (e.g., with embolus for the purposes of this document). Subsequently, static aspiration force is applied to the thrombus with the intent to aspirate the thrombus into the catheter. Thrombectomy can utilize aspiration alone or in combination with other devices such as stent retrievers, which are deployed across the thrombus and pulled into the catheter with the intention of capturing the thrombus. The procedural outcome is considered successful when a majority or all of the vascular territory in question is recanalized (also defined as "Thrombolysis in Cerebral Infarction score—TICI" of 2b or 3 respectively). "Successful" thrombectomy for stroke is achieved in approximately 80-85% of cases. However, complete recanalization (TICI 3) correlates to significantly better outcomes than incomplete recanalization (TICI<3).

A feared complication of thrombectomy procedures is thrombus breakdown with subsequent embolization into distal, smaller vessels. Smaller, distal vessels are difficult to access and thrombectomy on such small emboli is typically not performed resulting in unfavorable procedural and clinical outcomes. Similarly, primary emboli in distal smaller vessels are not usually considered for thrombectomy procedures despite patients presenting with significant clinical deficits.

SUMMARY

The disclosure includes an aspiration system synchronous with heart-rate or other biometric signal used to determine cerebral blood pulsatility comprising at least one sensor configured to be coupled to a patient. The system may further comprise a heart-rate or other biometric signal monitor, which can be configured to detect a heartbeat or other biometric signal of the patient. In some embodiments, the heart-rate or other biometric signal monitor is electrically coupled to the at least one sensor. The aspiration system may further comprise a catheter having a distal end and a proximal end located opposite the distal end. In some embodiments, the aspiration system further comprises aspiration tubing having a proximal end and a distal end located opposite the proximal end, wherein the distal end of the aspiration tubing is coupled to the proximal end of the catheter. The aspiration system may also include a collecting canister coupled to the aspiration tubing between the distal end and the proximal end of the aspiration tubing. In some embodiments, the aspiration system comprises a vacuum generator coupled to the proximal end of the aspiration tubing, the vacuum generator configured to pull a vacuum through the catheter to thereby aspirate a thrombus from the patient via the catheter. The vacuum generator may be configured to aspirate in response to the heart-rate or other biometric signal monitor detecting a heart rhythm or other biometric signal.

In some embodiments, the aspiration system further comprises a housing, wherein the vacuum generator is at least partially located within an internal portion of the housing. The aspiration system may also comprise a sensor connector coupled to the housing, and the sensor connector may be configured to receive a signal from the at least one sensor. In some embodiments, the at least one sensor connected to the patient is also connected to the sensor connector.

The aspiration system may comprise a pump on/off switch coupled to the housing. In some embodiments, the aspiration system comprises a pressure gauge coupled to the housing. The system may include an aspiration on/off coupled to the housing. In some embodiments, the aspiration system comprises a heart-rate or other biometric signal synchronous/override mode coupled to the housing. The aspiration system may include a dynamic/static aspiration switch coupled to the housing.

In some embodiments, the aspiration system comprises a heart-rate or alternate signal transmitting module coupled to the at least one sensor. The aspiration system may comprise a heart-rate or alternate signal receiving module connected to the system for receiving wireless communication with the heart-rate or alternate signal transmitting module.

In some embodiments, the aspiration system comprises a remote controller of the aspiration system, wherein the remote controller is at least partially located within an internal portion of the aspiration tubing. The aspiration system may comprise a membrane transducer with at least one one-way valve interposed between the aspiration tubing, the vacuum generator, and the collecting canister.

In some embodiments, the aspiration system includes at least one control for manual override as a failsafe that is coupled to the housing. The at least one control may be selected from the group consisting of a frequency control, a maximal aspiration pressure control, and a release pressure control.

The aspiration system may comprise a catheter operating switch coupled to the housing. In some embodiments, the aspiration system comprises a catheter controlling connector coupled to the housing.

In some embodiments, the aspiration system further comprises at least one electrode configured to transmit a signal selected from the group consisting of a heart-rate signal, a, blood pressure signal, an oximetry signal, a near-infrared spectrometry signal, an ultrasound or other intravascular blood flow signal, an intracranial pressure signal, a pressure measured through the aspiration catheter, and a pressure measured via a pressure monitor incorporated in the distal portion of the catheter.

The disclosure includes a method of a synchronous aspiration with cerebral blood pulsations, where heart-rate or other biometric signal is used to determine cerebral blood pulsatility. The method includes receiving a signal from a patient through at least one sensor and a sensor connector. The method may further comprise processing the received signal, and identifying trigger points for aspiration based on the received and processed signal. In some embodiments, the method includes generating a profile of a signal-synchronous aspiration pattern based on pre-determined cyclical pattern characteristics and the identified trigger points. The method may also include actuating a vacuum generator to deliver a desired aspiration profile to a catheter and to the patient.

In some embodiments, the method further comprises allowing for selective synchronization with the patient's heartbeat or other biometric signal. The method may further comprise the received signal being selected from the group consisting of a heart-rate signal, a blood pressure signal, an oximetry signal, a near-infrared spectrometry signal, an ultrasound or other intravascular blood flow signal, an intracranial pressure signal, a pressure measured through an aspiration catheter, and a pressure measured via a pressure sensor incorporated in a distal portion of the aspiration catheter.

In some embodiments, the generated aspiration profile is characterized by one or combination of the following: a delay after a heartbeat or other biometric signal, an aspiration load profile, a maximal aspiration pressure, a duration of maximal aspiration pressure, a release profile, and a release pressure.

BRIEF DESCRIPTION OF THE DRAWINGS

These and other features, aspects, and advantages are described below with reference to the drawings, which are intended to illustrate, but not to limit, the invention. In the drawings, like reference characters denote corresponding features consistently throughout similar embodiments.

DETAILED DESCRIPTION

Although certain embodiments and examples are disclosed below, inventive subject matter extends beyond the specifically disclosed embodiments to other alternative embodiments and/or uses, and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order-dependent. Additionally, the structures, systems, and/or devices described herein may be embodied as integrated components or as separate components.

For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Component Index

10—Patient
12—Catheter
14—Alternative access points: radial artery
16—Alternative access points: carotid artery
18—Aspiration catheter
20—Internal carotid artery
22—Middle cerebral artery
24—Thrombus/Embolus causing acute occlusion
26—Small thrombi in distal, peripheral vessels
28—Collapsed vessels between the catheter and the distal thrombi as a result of static aspiration
30—Successful aspiration of the distal emboli utilizing heart-rate synchronous dynamic aspiration
32—Connector
34—Aspiration tubing
36—Membrane transducer
38—Collecting canister
39—Vacuum generator
40—Pressure gauge
41—Housing
42—Heart-rate monitor
44—Sets of controls for manual override as a failsafe; as frequency (44a), maximal aspiration pressure (44b), release pressure (44c)
46—Pump On/Off switch
48—Aspiration On/Off switch
50—Heart-rate synchronous/Override mode
52—Dynamic/Static aspiration switch
54—Catheter operating switch
56—Sensor connector
58—Catheter controlling connector
60—Remote controller connector
62—At least one sensor connected to the pump with wires transmitting a signal
64—At least one sensor connected to the transmitter.
66—Heart-rate or alternate signal transmitting module
68—Heart-rate or alternate signal receiving module The invention disclosed herein describes a heart-rate synchronous aspiration method and device for the treatment of ischemic conditions such as, but not limited to, stroke or pulmonary embolism.

Figure 1:
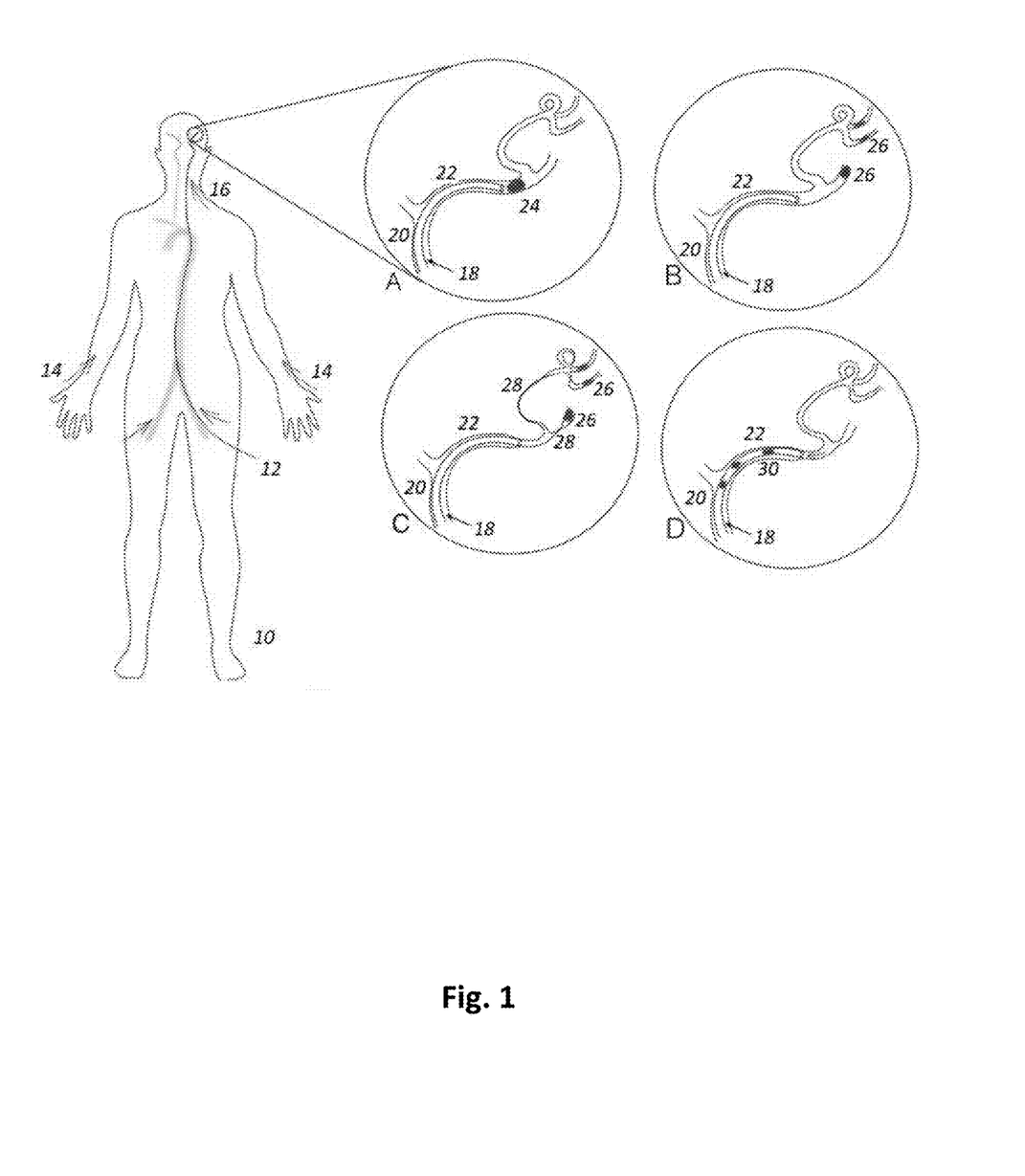
FIG. 1 illustrates a diagrammatic view of a patient undergoing a thrombectomy procedure, according to some embodiments.

FIG. 1 illustrates a patient 10 and includes four inset images, which will be described in detail as segments A-D. In some embodiments, during a thrombectomy procedure, the catheter 12 is introduced through the femoral artery, and navigated through the aorta and cervical vasculature to the intracranial vasculature. Rather than the femoral artery, the catheter 12 may be introduced through either radial artery (indicated by label 14 on the patient 10), or the carotid artery (indicated by label 16 on the patient 10). As illustrated in FIG. 1, segment A, a state of the art thrombectomy procedure may involve navigating an aspiration catheter 18 through cervical and brain vasculature, such as the internal carotid artery 20 and middle cerebral artery 22, as close to the site of occlusion as possible, preferentially in contact with the thrombus 24. In some embodiments, the catheter 18 is subsequently connected to a source of vacuum generated either manually with a syringe or by a commercially available aspiration pump, and a static aspiration force is applied through the catheter 18 directly onto the thrombus 24. The desired scenario is when the thrombus 24 is completely aspirated into the catheter 18 resulting in complete reperfusion.

As illustrated in FIG. 1, segment B, in the case of thrombus breakdown and distal embolization into smaller vessels (as indicated by the thrombi 26), or in the case of primary distal emboli, smaller brain vessels are difficult to catheterize and such emboli are not pursued. Catheterizing proximal vessels and applying aspiration force from a proximally located catheter alone with the intention to dislodge and aspirate thrombi from smaller, distal vessels is generally not successful. As illustrated in FIG. 1, segment C, the blood between the catheter 18 and the distal thrombus 26 may become aspirated causing the vessels to collapse (as indicated by the collapsed vessels 28). Such a phenomenon can prevent a successful thrombectomy procedure as the fluid column between the catheter 18 and the thrombus 26 is interrupted and the collapsed vessel 28 creates a dynamic occlusion preventing the aspiration force from reaching the thrombus 26.

Dynamic aspiration synchronized with cerebral blood pulsations may improve thrombectomy, specifically thrombectomy of distal thrombi, by utilizing collateral blood supply to maintain or re-establish the fluid column between the catheter and the distal thrombus and by utilizing innate brain pulsatility to increase pressure gradient across the thrombus.

Other cyclical/pulse aspiration systems have been described in the field of medicine. Examples of such systems include medical devices designed for liposuction (US20170296712A1, Systems, methods and handheld pulsatile aspiration and injection devices), devices designed to remove cerebral hemorrhage (US20190167406A1, Methods of treating intracerebral hemorrhages using cyclical aspiration patterns) or devices that use non-synchronized cyclical or pulse aspiration to help remove blood clots from the veins or arteries (U.S. Pat. No. 11,096,703B2, Catheter Assembly for Blood Clots Removal; US20210353314A1, Mechanically resonant pulse relief valve for assisted clearing of plugged aspiration; WO2014151209A8, Dynamic aspiration methods and systems; U.S. Pat. No. 9,681,882B2, Rapid aspiration thrombectomy system and method; WO2018019829A1, A clot retrieval system for removing occlusive clot from a blood vessel; U.S. Pat. No. 10,661,053B2, Method of pulsatile neurovascular aspiration with telescoping catheter; U.S. Pat. No. 10,786,270B2, Neurovascular aspiration catheter with elliptical aspiration port; U.S. Pat. No. 10,653,434B1, Devices and methods for removing obstructive material from an intravascular site; U.S. Pat. No. 10,441,745B2, Neurovascular catheter with enlargeable distal end; US20200009301A1, Vacuum transfer tool for extendable catheter; US20160166265A1, Methods and Devices for Removal of Thromboembolic Material; U.S. Pat. No. 10,335,260B2, Methods of treating a thrombus in a vein using cyclical aspiration patterns; U.S. Pat. No. 10,517,633B2, Thrombectomy and soft debris removal device; U.S. Pat. No. 9,883,885B2, System and method of ablative cutting and pulsed vacuum aspiration; U.S. Pat. No. 10,531,883B1, Aspiration thrombectomy system and methods for thrombus removal with aspiration catheter; U.S. Pat. No. 10,471,233B2, Methods and systems for treatment of acute ischemic stroke). These devices and systems disclose cyclical or pulse aspiration in a non-synchronized fashion and are generally intended to utilize pulse aspiration to break down the blood clot or other occluding material in a vessel. Such breakdown of a blood clot into smaller particles and subsequent occlusion of smaller, more distal vessels, is in fact a feared complication of thrombectomy for stroke.

As seen in FIG. 1, segment D, in some embodiments, cyclical aspiration appropriately synchronized with cerebral blood pulsations allows collateral vasculature to refill the vascular territory extending from the catheter 18 to the thrombus 26 between aspiration pulses, thus maintaining or re-establishing the fluid column between the tip of the aspiration catheter 18 and the thrombus 26 and preventing vessel collapse that causes dynamic obstruction. Furthermore, when appropriately timed, synchronous aspiration may utilize innate brain pulsatility to increase the pressure gradient across the thrombus 26, which results from pressure in the vessel distal to the thrombus 26 (corresponding approximately to the intracranial pressure) and proximal to the thrombus 26 (caused by aspiration), to increase chances of thrombus dislodgment. In short, FIG. 1, segment D, at point 30 illustrates successful aspiration of the distal emboli utilizing cerebral pulsation synchronous dynamic aspiration. Though described in detail above, FIG. 1 will be further discussed later in this disclosure.

In some embodiments, heart-rate is the easiest and most robust surrogate to obtain an approximation of cerebral blood pulsations. Other biometric data such as (central or peripheral) arterial line pulsatility (blood pressure pulsatility), pulse oximetry, near-infrared spectroscopy, intracranial pressures waveform, transcranial doppler ultrasound or carotid doppler ultrasound may also be used. Alternatively, the aspiration catheter 18 itself could be utilized to obtain intracranial blood flow pulsatility reading. In other words, various biometric parameters including, but not limited to, blood pressure and its changes, intravascular blood flow and its changes, oxygen saturation and its changes, brain activity, and brain pressure and its changes, can be used to determine cerebral blood pulsatility and timing of aspiration cycles.

Other medical devices and system have been described to utilize synchronization with the cardiac cycle. Invention USOO5885244A, Synchronous, pulsatile angioplasty system, discloses a system wherein a balloon is inflated and deflated in response to a cardiac cycle. This system is designed to minimize procedural occlusion during angioplasty procedure, but does not disclose synchronized aspiration of occlusive material from a blood vessel. Invention US20210220528A1, Medical aspiration (and related family of inventions: US20220061872A1, US20220061870A1, US20220062588A1, US20220061871A1, WO2022047324A1), discloses an aspiration system that applies aspiration based on a cardiac cycle. A key component of our system is synchronization with cerebral blood pulsations (which is determined using various biometric signals) that allows for re-establishment of fluid column between the catheter and the occlusive material (e.g., embolus) hence improving aspiration thrombectomy of distal emboli in smaller vessels, that are difficult to catheterize.

Figure 2:
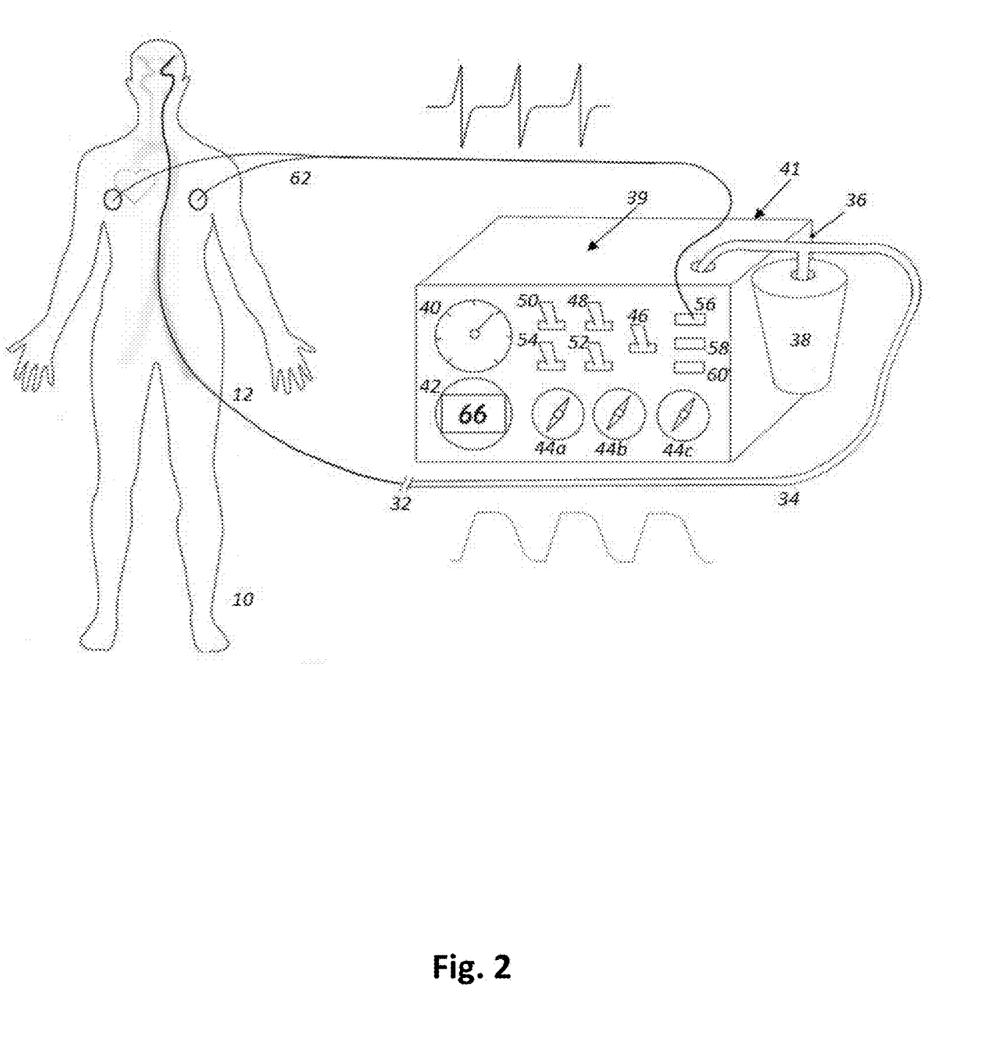
FIG. 2 illustrates a diagrammatic view of an embodiment of the heart-rate synchronous aspiration system whereas the system senses the patient's heart rate and delivers cyclical aspiration synchronized with the heart rate.

As illustrated in FIG. 2, in some embodiments, the invention described represents an aspiration system that generates dynamic aspiration where each aspiration cycle is synchronized with pulsatile flow in cerebral vessels. The heart rate may be determined with for example, but not limited to, at least one skin sensor, which may also be used to infer cerebral blood pulsatility. In some embodiments, arterial pulse is determined via a peripheral or central arterial line, and is used to infer cerebral blood pulsatility. Pulse oximetry waveform may be determined for example from the finger or earlobe, and may be used to infer cerebral blood pulsatility. In another embodiment, near-infrared spectroscopy is used to infer cerebral blood pulsatility. Ultrasound as of, but not limited to, cranial or cervical vessels, may be used to infer cerebral blood pulsatility. In some embodiments, intracranial pressure waveform is used to infer cerebral blood pulsatility. Re-establishment of the fluid column between the catheter and the distal emboli may also be inferred from pressure changes as measured through the catheter. Alternatively, in some embodiments, the distal portion of the catheter can be fitted with a pressure sensor to measure pressure changes and cerebral blood flow pulsatility. The invention disclosed herein consists of a system, as illustrated in FIGS. 2 and 3 (and described in greater detail later in this disclosure), that may include some or all of the following components and circuitries, such as, but not limited to:

a vacuum generator 39
cyclical aspiration modifier
heart-rate sensing unit 62, 64
controller unit
pressure monitoring unit
control panel
a collection canister 38
aspiration tubing 34
remote controller Heart Rate Sensing Unit In some embodiments, the aspiration system utilizes the patient's 10 heart rhythm to time delivery of aspiration cycles. As illustrated in FIG. 2, in one embodiment the system is connected to the patient 10 with at least one skin electrode 62. The at least one skin electrode 62 may comprise at least one sensor connected to the pump with wires transmitting a signal. Several different types of signals may be transmitted from the at least one sensor to the pump. In some embodiments, a heart-rate signal is utilized. Alternatively, an arterial pulse signal can be utilized. An oximetry signal may be utilized. In some embodiments, a near-infrared spectrometry signal is utilized. A doppler ultrasound signal may be utilized. In some embodiments, an intracranial pressure signal is utilized. A pressure measured through the aspiration catheter may be utilized. In some embodiments, a pressure measured via a pressure monitor incorporated in the distal portion of the aspiration catheter is used.

Figure 3:
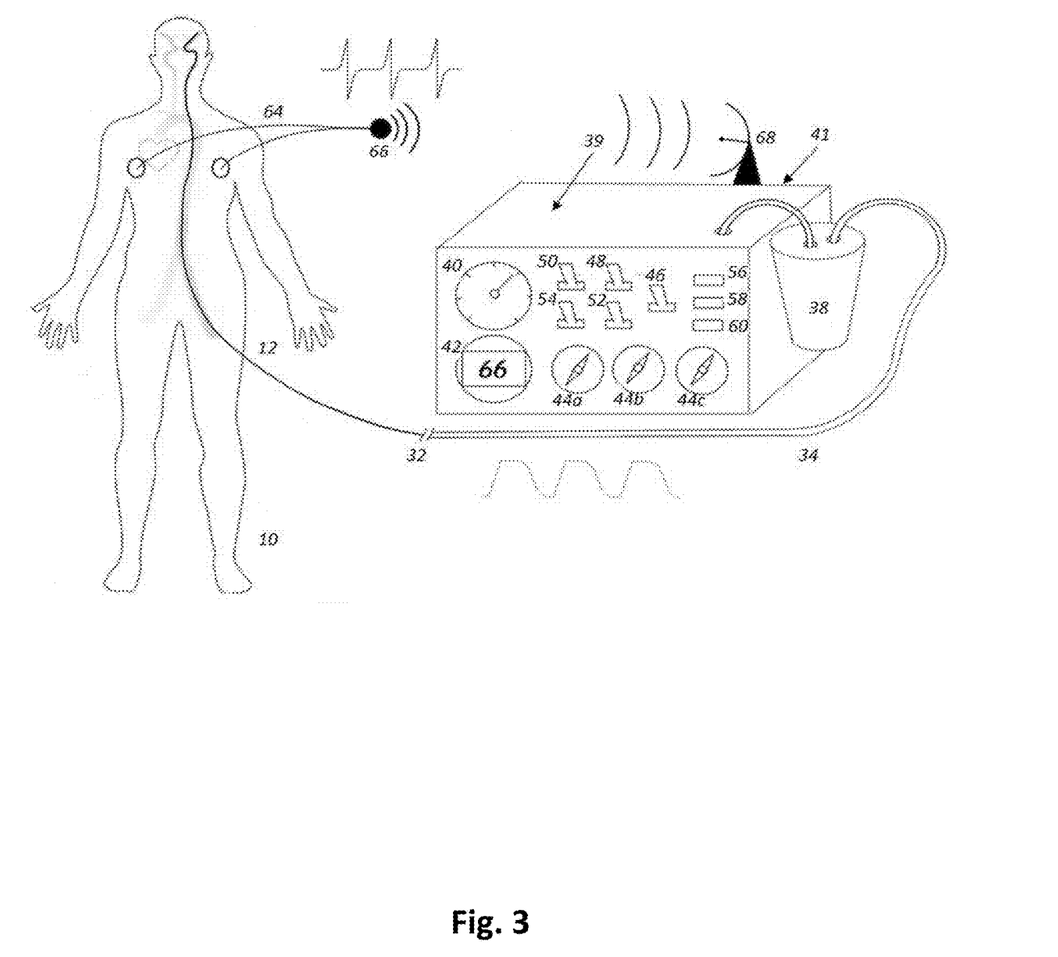
FIG. 3 illustrates a diagrammatic view of an embodiment of the heart-rate synchronous aspiration system whereas the patient's heart rate is transmitted wirelessly to the system and the pump accordingly delivers cyclical aspiration synchronized with the heart rate.

In some embodiments, the system receives an input from a patient's monitor, such as a commercially available monitor that is used to monitor patient's vital signs during the procedure (indicated by the heart rate monitor 42 shown in FIGS. 2 and 3). In another embodiment, arterial pulse as sensed via a peripheral or central arterial line is used in substitution for heart-rate and to infer cerebral blood pulsations. Pulse oximetry waveform as sensed for example from the finger or earlobe may be used to infer pulsatile flow in cerebral vessels. In some embodiments, near-infrared spectroscopy is used to substitute heart-rate and infer cerebral blood pulsatility. In another embodiment, doppler ultrasound as of, but not limited to, cranial or cervical vessels, is used to substitute heart-rate and to infer cerebral blood pulsatility. Intracranial pressure waveform may be used to substitute heart-rate and to infer cerebral blood pulsatility.

As illustrated in FIG. 3, in some embodiments, the signal can be transmitted either through cables or wirelessly. Similar to the at least one skin electrode 62 shown in FIG. 2, the system illustrated in FIG. 3 may be wirelessly connected to the patient 10 with at least one skin electrode 64. The at least one skin electrode 64 may comprise at least one sensor connected to the transmitter. Several different types of signals may be transmitted from the at least one sensor to the transmitter. In some embodiments, a heart-rate signal is utilized. Alternatively, an arterial pulse signal can be utilized. An oximetry signal may be utilized. In some embodiments, a near-infrared spectrometry signal is utilized. A doppler ultrasound signal may be utilized. In some embodiments, an intracranial pressure signal is utilized. A pressure measured through the aspiration catheter may be utilized. Alternatively, cerebral blood flow pulsatility may be sensed through the aspiration catheter 18 as propagating pressure changes. Alternatively, in additional embodiments, the distal portion of the catheter can be fitted with a pressure sensor to measure pressure changes and blood flow pulsatility directly. In some embodiments, the unit may process heart-rate or alternate signals and identify trigger points to be used to synchronize delivery of individual aspiration cycles.

Cyclical Aspiration Generator

Figure 4:
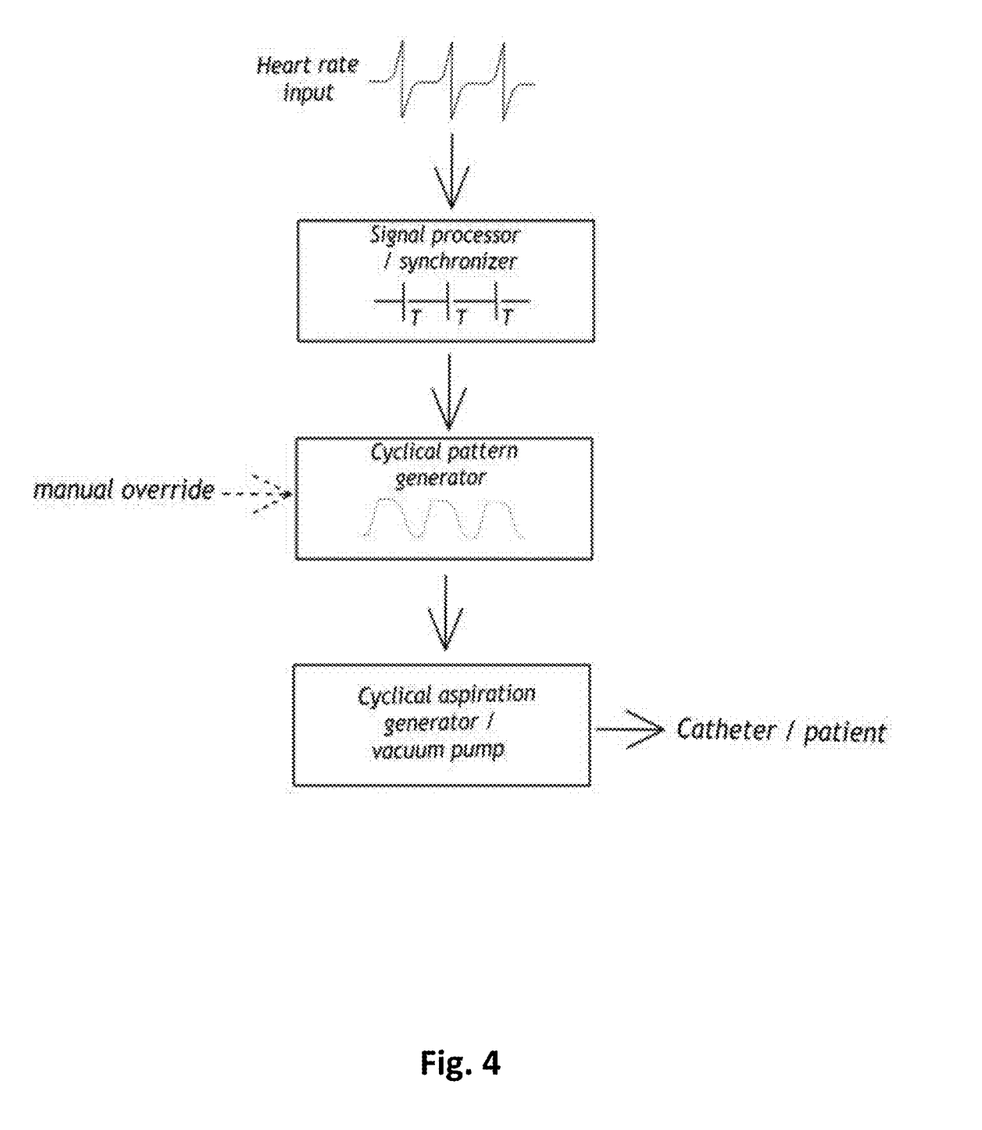
FIG. 4 illustrates a schematic view of the organization of the heart-rate synchronous aspiration system, according to some embodiments.
Figure 5:
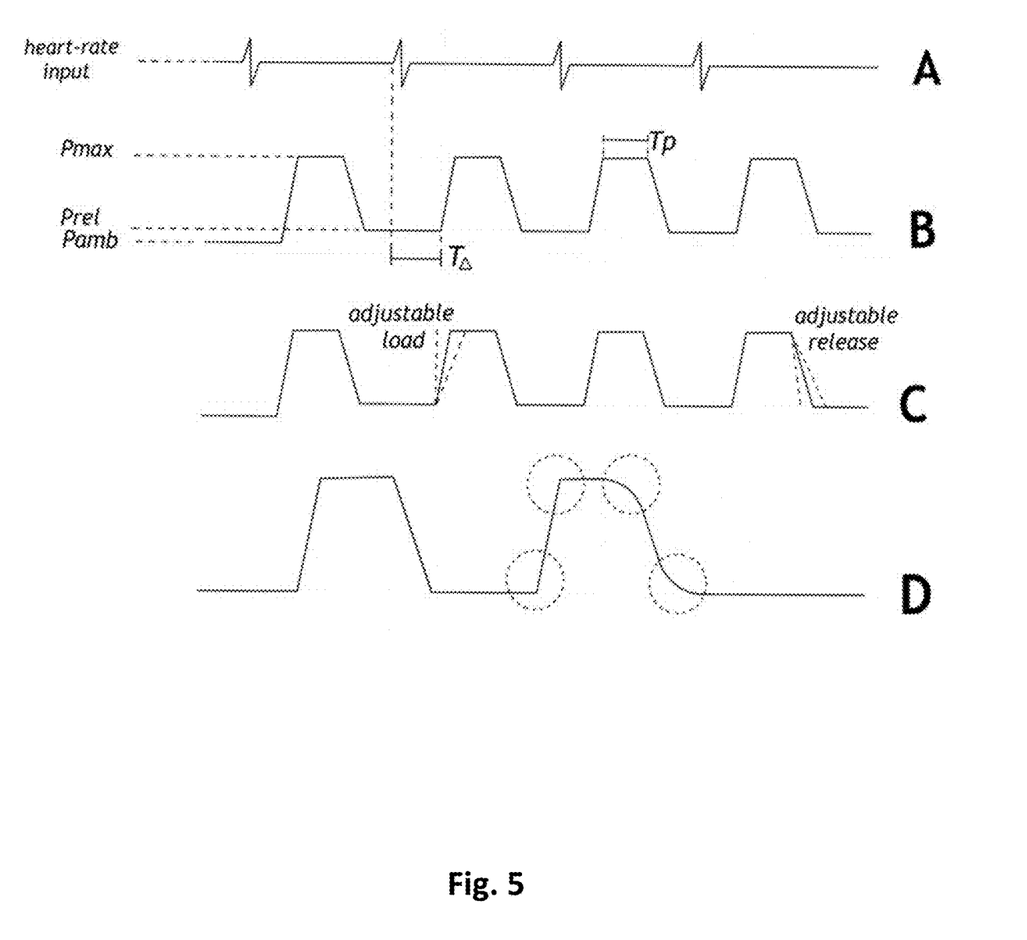
FIG. 5 illustrates a schematic view depicting the heart-rate synchronous aspiration pattern whereas the profile can be adjusted by modifying multiple variables, according to some embodiments.

As illustrated in FIG. 4, in some embodiments, the system contains circuitry or a component that generates desired aspiration profile that is to be synchronized with heart-rate or alternate signal as described above. As illustrated in FIG. 5, in some embodiments, the generated cyclical pattern has an adjustable character through modifiable parameters such as, but not limited to:

delay after a heartbeat or alternate signal trigger (TΔ)
aspiration load profile (aka upslope)
maximal aspiration pressure (Pmax)
duration of maximal aspiration pressure (aka plateau; Tp)
release profile (aka downslope)
release pressure (aka minimal aspiration pressure; Prel)
selective synchronization (i.e. aspiration cycle can be synchronized with each heartbeat, or with each $2^{nd}$, $3^{rd}$ . . . $N^{th}$ heartbeat; alternatively 2, 3 . . . n aspiration cycles can be synchronized with each heartbeat or alternate signal)

FIGS. 4 and 5 will be discussed in greater detail later in the disclosure.

Controller Unit

Figure 6:
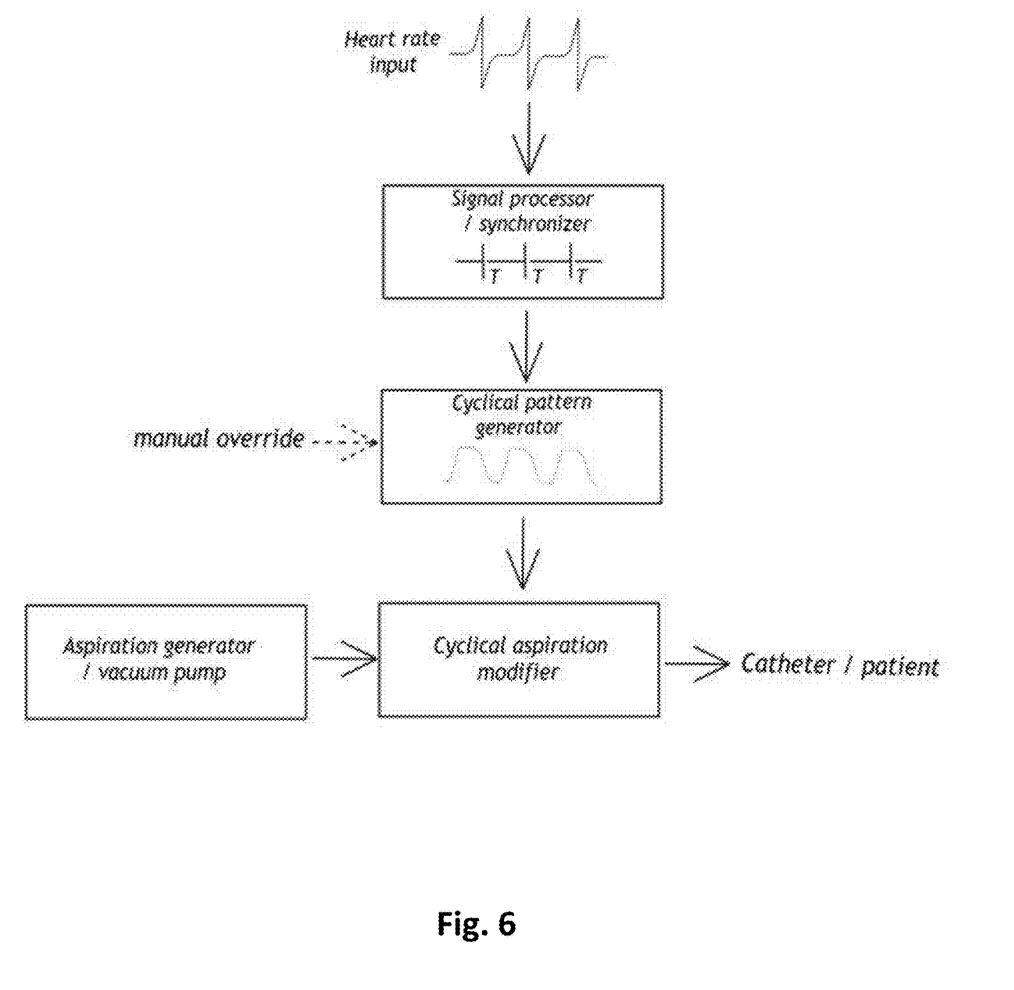
FIG. 6 illustrates a schematic view of the organization of the heart-rate synchronous aspiration system, according to some embodiments.

As illustrated in FIGS. 4 and 6, in some embodiments, the system contains a controller unit that receives an input from the heart rate sensing unit, the user operated control panel and cyclical pattern generator. The controller unit may be configured to process the received trigger signals and combine the signals with the desired character of cyclical aspiration as described in the "Cyclical Aspiration Generator" subsection of this disclosure. In some embodiments, the controller unit provides a signal to the vacuum generator 39 and/or to the cyclical aspiration modifier. The controller unit may include backup algorithms that allow for automatic or manual override in case of heart rate or alternate signal sensing failure. In such event, the system will switch into heart rate or alternate signal independent regime, where, in some embodiments, the system utilizes a pre-determined cyclical or static aspiration pattern. In the manual override regime, various aspiration parameters can be adjusted by the controls 44 shown in FIGS. 2 and 3, such as, but not limited to:

static or dynamic aspiration mode
    frequency
    aspiration load profile (aka upslope)
    maximal aspiration pressure (Pmax)
    duration of maximal aspiration pressure (aka plateau; Tp)
    release profile (aka downslope)
    release pressure (minimal aspiration pressure, Prel)

Cyclical Aspiration Modifier

As illustrated in FIG. 6 (which is further described later in this disclosure), in some embodiments, the vacuum generator 39 provides static aspiration force, that can be adjusted up to virtual vacuum. In such an embodiment, the vacuum generator 39 is connected to a cyclical aspiration modifier, that alters static aspiration into a desired heart rate or alternate signal synchronous dynamic aspiration pattern.

As illustrated in FIG. 5, in some embodiments, the cyclical aspiration modifier is incorporated into the vacuum pump and delivers dynamic aspiration pattern that has adjustable character through modifiable parameters such as, but not limited to:

delay after a heartbeat or alternate signal (T$\Delta$)
    aspiration load profile (aka upslope)
    maximal aspiration pressure (Pmax)
    duration of maximal aspiration pressure (aka plateau; Tp)
    release profile (aka downslope)
    release pressure (aka minimal aspiration pressure; Prel)
    selective synchronization (i.e. aspiration cycle can be synchronized with each heartbeat, or with each $2^{nd}$, $3^{rd}$ . . . $N^{th}$ heartbeat; alternatively 2, 3 . . . n aspiration cycles can be synchronized with each heartbeat or alternate signal)

Vacuum Generator

The vacuum generator 39 may utilize a vacuum pump such as, but not limited to, a piston pump, a peristaltic pump, or a reciprocating screwdrive pump. In some embodiments, the vacuum generator 39 utilizes air as medium. The vacuum generator 39 may utilize fluid as medium. As illustrated in FIG. 4, in some embodiments, the vacuum generator 39 provides a cyclical aspiration pattern, that is appropriately synchronized with heart rate or alternate signal based on the input from the heart-rate sensing unit 62, 64 and the controller unit. As illustrated in FIG. 6, the vacuum generator 39 may provide static aspiration force, that is further altered by a cyclical aspiration modifier to provide final desired heart-rate or alternate signal synchronized dynamic aspiration pattern. In some embodiments, the pump provides aspiration force that is adjustable and can equal up to virtual vacuum.

As illustrated in FIG. 5, in some embodiments where the vacuum generator 39 is actuated so that it provides desired heart rate or alternate signal synchronous cyclical aspiration pattern, that can have adjustable character through modifiable parameters such as, but not limited to:

delay after a heartbeat or alternate signal (T$\Delta$)
    aspiration load profile (aka upslope)
    maximal aspiration pressure (Pmax)
    duration of maximal aspiration pressure (aka plateau; Tp)
    release profile (aka downslope)
    release pressure (aka minimal aspiration pressure; Prel)
    selective synchronization (i.e. aspiration cycle can be synchronized with each heartbeat, or with each $2^{nd}$, $3^{rd}$ . . . $N^{th}$ heartbeat; alternatively 2, 3 . . . n aspiration cycles can be synchronized with each heartbeat or alternate signal)

Collecting Canister

Figure 7A:
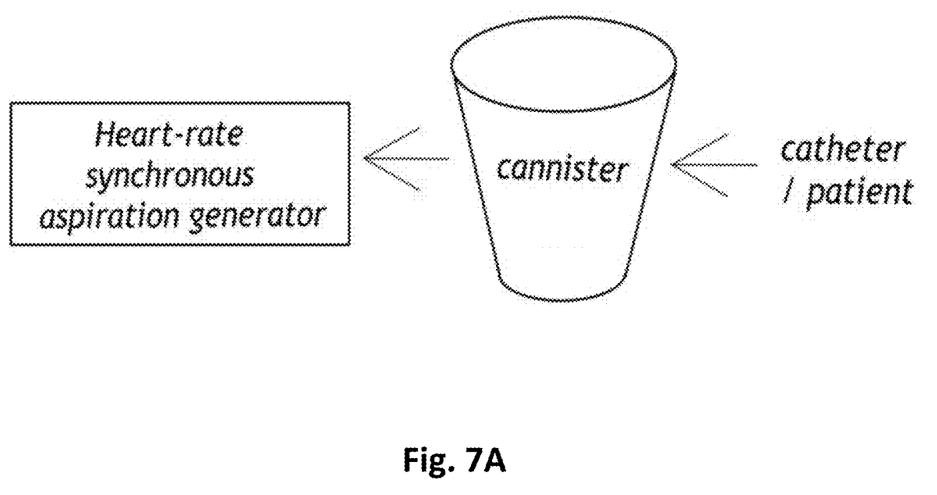
FIG. 7A illustrates a schematic view showing a collecting canister interposed between the aspiration tubing and the pump, according to some embodiments.
Figure 7B:
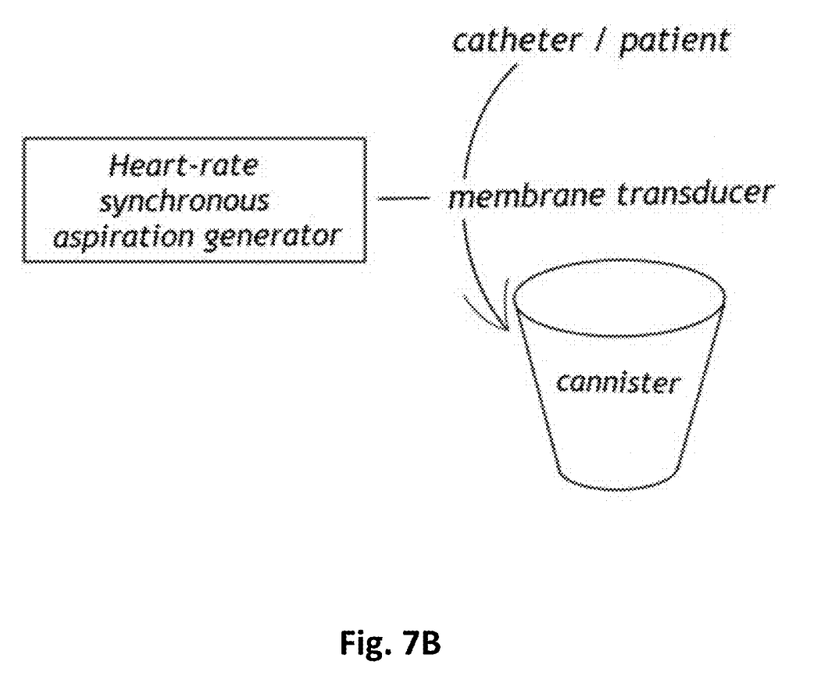
FIG. 7B illustrates a schematic view showing a membrane-chamber transmitter with at least one one-way valve interposed between the aspiration tubing and the canister that transmits aspiration to the aspiration tubing, according to some embodiments.

As illustrated in FIG. 7A, in some embodiments, the collecting canister 38 is interposed between the aspiration tubing 34 and the vacuum generator 39. As illustrated in FIG. 7B, in some embodiments there is a membrane transducer 36, with at least one one-way valve, interposed between the aspiration tubing 34 and the canister 38, that transmits suction to the aspiration tubing 34. Such a configuration may allow a fluid or air operated system to remain clean and separate from the aspirated material and may significantly decrease the amount of medium to which aspiration force is applied with each aspiration cycle. FIGS. 7A and 7B will be discussed in greater detail later in the disclosure.

Aspiration Tubing

In some embodiments, the system connects to the aspiration catheter 18 via an aspiration tubing 34. The tubing 34 may include a universal connector 32 (shown in FIGS. 2 and 3) to connect to the aspiration catheter 18 such as, but not limited to, a luer connector. In some embodiments, the other end of the aspiration tubing 34 connects to the aspiration system at, for example, the collecting canister 38, the membrane transducer, or the filter. The aspiration tubing 34 may include a remote controller that operates various functions of the system, such as, but not limited to, turning the system on or off, selecting different aspiration patterns or activating or sending an impulse to other possible parts of the system such as, but not limited to, various aspiration catheters 18. In some embodiments, the remote controller is electrically connected to the main system with wires, which may be contained in the aspiration tubing wall or may run separate from the aspiration tubing 34. Such a controller may communicate with the main system wirelessly.

FIG. 1 illustrates a thrombectomy procedure whereas a catheter 12 is introduced into the cerebral circulation to close proximity of the occlusion, as illustrated in segment A. An aspiration catheter 18 is inserted through the internal carotid artery 20 and middle cerebral artery 22 to make contact with a thrombus/embolus causing acute occlusion 24. A feared complication of thrombectomy procedure is when the thrombus breaks down and embolizes into smaller distal vessels as illustrated in segment B. As illustrated in segment B, a complication to the procedure may occur through the breaking down of the thrombus/embolus causing acute occlusion 24 into small thrombi in distal, peripheral vessels 26. Successful aspiration in such case is difficult as the vessels between the catheter in the larger, proximal vessel and the thrombi in the distal, smaller vessels, collapse under aspiration as illustrated in segment C. As illustrated in segment C, when the thrombus/embolus causing acute occlusion 24 breaks down into small thrombi in distal, peripheral vessels 26, successful aspiration becomes difficult because of collapsed vessels between the catheter and the distal thrombi as a result of static aspiration 28. Heart-rate or alternate signal synchronous aspiration allows collateral vasculature to refill the concerned vessel segment between aspiration pulses, thus maintaining or re-establishing the fluid column between the tip of the aspiration catheter and the thrombus and preventing vessels collapse that causes dynamic obstruction. Maintaining of the fluid column allows for aspiration throughout the vasculature distal to the catheter and facilitates successful thrombectomy as illustrated in segment D. Successful aspiration of the distal emboli utilizing heart-rate or alternate signal synchronous dynamic aspiration occurs when the collateral vasculature refills the concerned vessel segment between aspiration pulses, thus maintaining or re-establishing the fluid column between the tip of the aspiration catheter 18 and the thrombus/embolus causing acute occlusion 24 and 26 and preventing vessels collapse that causes dynamic obstruction, leading to successful aspiration of the thrombi 30 as illustrated in segment D.

FIG. 2 illustrates a possible embodiment of the heart-rate synchronous aspiration system ("pump") whereas the system senses the patient's heart rate and delivers cyclical aspiration synchronized with the heart rate. The device depiction represents a possible embodiment. In some embodiments the system may consist of a catheter introduced through the femoral artery, aorta, and cervical vasculature to the intracranial vasculature 12, which leads to a connector such as, but not limited to, a luer connector 32. The connector connects to aspiration tubing, which in a possible embodiment the aspiration tubing contains a remote controller of the aspiration system 34. In a possible embodiment, a membrane transducer with at least one one-way valves 36 is interposed between the aspiration tubing 34, a collecting canister 38, and a vacuum generator 39. The vacuum generator 39 is at least partially located within an internal portion of the housing 41. The pump may comprise a pressure gauge 40, a heart-rate monitor 42, sets of controls for manual override as a failsafe such as frequency 44a, maximal aspiration pressure 44b, and release pressure 44c, all of which can be coupled to the housing 41. The pump further may comprise a pump on/off switch 46, an aspiration on/off switch 48, a heart-rate synchronous/override mode switch 50, a dynamic/static aspiration switch 52, a catheter operating switch 54, a sensor connector 56, a catheter controlling connector 58 and a remote controller connector 60, all of which can be coupled to the housing 41. At least one sensor connected to the pump with wires transmitting heart-rate signal 62 are connected to the patient 10 and the pump.

FIG. 3 illustrates a possible embodiment of the heart-rate synchronous aspiration system ("pump") whereas the patient's heart rate is transmitted wirelessly to the system and the pump accordingly delivers cyclical aspiration synchronized with the heart rate. The device depiction represents a possible embodiment. In this embodiment, at least one sensor is connected to the transmitter 64. In another embodiment, an arterial pulse signal can be utilized. In another embodiment an oximetry signal can be utilized. In another embodiment a near-infrared spectrometry signal can be utilized. In another embodiment a doppler ultrasound signal can be utilized. In another embodiment, an intracranial pressure signal can be utilized. Additionally, these embodiments may comprise of a heart-rate or alternate signal transmitting module 66 connected to at least one sensor 64 and a heart-rate or alternate signal receiving module 68 connected to the pump.

FIG. 4 illustrates a possible schematic organization of the heart-rate synchronous aspiration system, whereas a heart-rate or alternate signal is received by the system and processed and trigger points (T) are identified. Subsequently a profile of a heart-rate or alternate signal synchronous cyclical aspiration pattern is generated based on pre-determined cyclical pattern characteristics as: delay after a heart beat or alternate signal (T$\Delta$), aspiration load profile (aka upslope), maximal aspiration pressure (Pmax), duration of maximal aspiration pressure (aka plateau; Tp), release profile (aka downslope), release pressure (aka minimal aspiration pressure; Prel). The system also allows for selective synchronization with each $2^{nd}$ heartbeat or alternate signal, or with each $3^{rd}$, $4^{th}$ . . . $N^{th}$ heartbeat or alternate signal; alternatively 2, 3 . . . n aspiration cycles can be synchronized with each heartbeat or alternate signal. After the desired heart-rate synchronous cyclical aspiration pattern is determined, the controller/generator actuates the vacuum generator to deliver desired aspiration profile to the catheter and to the patient.

FIG. 5 illustrates a possible schematic depiction of the heart-rate or alternate signal synchronous aspiration pattern whereas the profile can be adjusted by modifying multiple variables. A (x-axis is voltage, y-axis is time) represents a visual representation of a heart-rate input in form of an electrocardiogram. In other embodiments the synchronization trigger points are identified from arterial line signal, pulse oximetry signal, near-infrared spectroscopy signal, doppler ultrasound signal or intracranial pressure signal. In another embodiment the trigger points are identified from direct pressure measurements through the aspiration catheter or from a pressure sensor incorporated in the catheter. B (x-axis is pressure, y-axis is time) represents an example of a desired heart-rate synchronized dynamic aspiration whereas different parameters can be adjusted such as: delay after a heart beat or alternate signal (T$\Delta$), maximal aspiration pressure (Pmax), duration of maximal aspiration pressure (aka plateau; Tp) or release pressure (aka minimal aspiration pressure; Prel). The system allows for selective synchronization (i.e. aspiration cycle can be synchronized with each heartbeat or alternate signal, or with each $2^{nd}$, $3^{rd}$ . . . $N^{th}$ heartbeat or alternate signal; alternatively 2, 3 . . . n aspiration cycles can be synchronized with each heartbeat or alternate signal). C (x-axis is pressure, y-axis is time) shows further adjustable dynamic aspiration profile parameters as aspiration load profile (aka upslope) or release profile (aka downslope). The transition points of the aspiration curve can be adjusted to further modify the final desired aspiration profile.

FIG. 6 illustrates a possible schematic organization of the heart-rate synchronous aspiration system, whereas a heart-rate or alternate signal is received by the system and processed and trigger points (T) are identified. Subsequently a profile of a heart-rate or alternate signal synchronous cyclical aspiration pattern is generated based on pre-determined cyclical pattern characteristics as: delay after a heart beat or alternate signal (T$\Delta$), aspiration load profile (aka upslope), maximal aspiration pressure (Pmax), duration of maximal aspiration pressure (aka plateau; Tp), release profile (aka downslope), release pressure (aka minimal aspiration pressure; Prel). The system also allows for selective synchronization with each heartbeat, or with each $2^{nd}$, $3^{rd}$ . . . $N^{th}$ heartbeat; alternatively 2, 3 . . . n aspiration cycles can be synchronized with each heartbeat or alternate signal. After the desired heart-rate or alternate signal synchronous cyclical aspiration pattern is determined, the controller/generator actuates the cyclical aspiration modifier. In this embodiment a static aspiration is provided and subsequently altered by the above-mentioned cyclical aspiration modifier. The desired aspiration profile is delivered to the catheter and to the patient.

FIG. 7A illustrates a possible embodiment in which the collecting canister can be interposed between the aspiration tubing and the pump.

FIG. 7B illustrates another possible embodiment in which there is a membrane-chamber transducer with at least one one-way valves interposed between the aspiration tubing and the canister, that transmits aspiration to the aspiration tubing. Such a system allows fluid or air operated system to remain clean and separate from the aspirated material.

Interpretation

None of the steps described herein is essential or indispensable. Any of the steps can be adjusted or modified. Other or additional steps can be used. Any portion of any of the steps, processes, structures, and/or devices disclosed or illustrated in one embodiment, flowchart, or example in this specification can be combined or used with or instead of any other portion of any of the steps, processes, structures, and/or devices disclosed or illustrated in a different embodiment, flowchart, or example. The embodiments and examples provided herein are not intended to be discrete and separate from each other.

The section headings and subheadings provided herein are nonlimiting. The section headings and subheadings do not represent or limit the full scope of the embodiments described in the sections to which the headings and subheadings pertain. For example, a section titled "Topic 1" may include embodiments that do not pertain to Topic 1 and embodiments described in other sections may apply to and be combined with embodiments described within the "Topic 1" section.

To increase the clarity of various features, other features are not labeled in each figure.

The various features and processes described above may be used independently of one another, or may be combined in various ways. All possible combinations and subcombinations are intended to fall within the scope of this disclosure. In addition, certain method, event, state, or process blocks may be omitted in some implementations. The methods, steps, and processes described herein are also not limited to any particular sequence, and the blocks, steps, or states relating thereto can be performed in other sequences that are appropriate. For example, described tasks or events may be performed in an order other than the order specifically disclosed. Multiple steps may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

The term "and/or" means that "and" applies to some embodiments and "or" applies to some embodiments. Thus, A, B, and/or C can be replaced with A, B, and C written in one sentence and A, B, or C written in another sentence. A, B, and/or C means that some embodiments can include A and B, some embodiments can include A and C, some embodiments can include B and C, some embodiments can only include A, some embodiments can include only B, some embodiments can include only C, and some embodiments can include A, B, and C. The term "and/or" is used to avoid unnecessary redundancy.

While certain example embodiments have been described, these embodiments have been presented by way of example only and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein.

What is claimed is:

1. A method, comprising:
   receiving a signal from a patient through at least one sensor and a sensor connector;
   processing the received signal;
   monitoring a cardiac cycle signal from the patient; and
   modifying the received signal via the cardiac cycle signal to infer a cerebral pulsatility
   identifying trigger points based on the cerebral pulsatility;
   generating a profile of a signal-synchronous aspiration pattern based on pre-determined cyclical pattern characteristics and the identified trigger points; and
   actuating a vacuum generator to deliver a desired aspiration profile to a catheter and to the patient.

2. The method of claim 1, further comprising allowing for selective synchronization with the patient's cerebral pulsatility.

3. The method of claim 1,
   wherein the received signal is a near-infrared spectrometry signal, the method further comprising using the near-infrared spectrometry signal to infer the cerebral pulsatility of the patient.

4. The method of claim 1, wherein the received signal is an intravascular blood flow signal, the method further comprising using the intravascular blood flow signal to infer the cerebral pulsatility.

5. The method of claim 4, wherein the intravascular blood flow signal is an ultrasound.

6. The method of claim 1, wherein the received signal is an intracranial pressure signal, the method further comprising using the intracranial pressure signal to infer the cerebral pulsatility.

7. The method of claim 1, wherein the received signal is a pressure, the method further comprising using the pressure to infer the cerebral pulsatility.

8. The method of claim 7, further comprising measuring the pressure through the catheter.

9. The method of claim 7, further comprising measuring the pressure via a pressure sensor incorporated in a distal portion of the catheter.

10. The method of claim 1, wherein the cardiac cycle signal is a heart-rate.

11. The method of claim 1, wherein the cardiac cycle signal is a blood pressure.

12. The method of claim 1, wherein the cardiac cycle signal is a pulse oximetry.

13. The method of claim 1, further comprising the generated profile of a signal-synchronous aspiration pattern being created by a delay after the received signal.

14. The method of claim 1, further comprising the generated profile of a signal-synchronous aspiration pattern being created by an aspiration load profile.

15. The method of claim 1, further comprising the generated profile of a signal-synchronous aspiration pattern being created by a maximal aspiration pressure.

16. The method of claim 1, further comprising the generated profile of a signal-synchronous aspiration pattern being created by a duration of maximal aspiration pressure.

17. The method of claim 1, further comprising the generated profile of a signal-synchronous aspiration pattern being created by a release profile.

18. The method of claim 1, further comprising the generated profile of a signal-synchronous aspiration pattern being created by a release pressure.

\* \* \* \* \*